(No Model.)
A. E. OGDEN.
HORSESHOE.
No. 511,093. Patented Dec. 19, 1893.
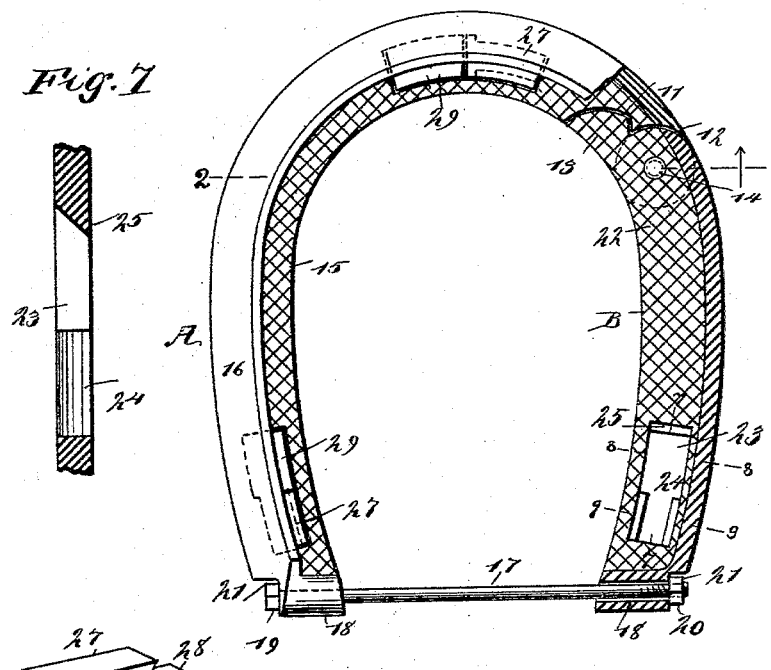
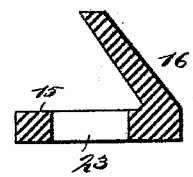
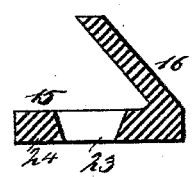
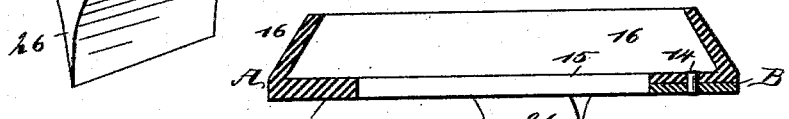
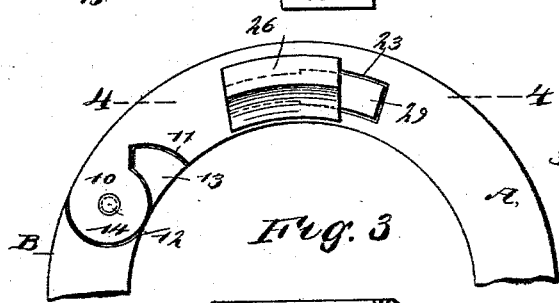
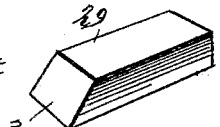
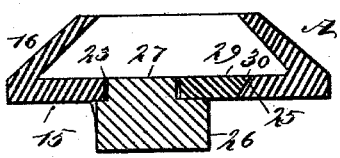
WITNESSES:
J. A. Bergstrom
C. Sedgwick
INVENTOR
A. E. Ogden
BY
Munn & Co
ATTORNEYS.
THE NATIONAL LITHOGRAPHING COMPANY,
WASHINGTON, D. C.

UNITED STATES PATENT OFFICE.

ARTHUR E. OGDEN, OF ASHLEY, NORTH DAKOTA.

HORSESHOE.

SPECIFICATION forming part of Letters Patent No. 511,093, dated December 19, 1893.

Application filed June 15, 1893. Serial No. 477,727. (No model.)

*To all whom it may concern:*

Be it known that I, ARTHUR EDWARDS OGDEN, of Ashley, in the county of McIntosh and State of North Dakota, have invented a new and useful Improvement in Horseshoes, of which the following is a full, clear, and exact description.

My invention relates to an improvement in horse shoes, and it has for its object to provide a horse shoe which may be made to fit perfectly to the foot, and which may be applied to the hoof or removed from it by any person, which change may be effected with dispatch and convenience.

Another feature of the invention is to so construct the shoe that it will be provided with removable calks, the calks being capable of being readily placed in position upon the body of the shoe, or removed therefrom and replaced whenever desirable.

A further feature of the invention is to so shape the shoe that the weight of the animal will maintain the calks in position, and whereby the shoe may be quickly and securely locked in position upon the hoof.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a plan view of the improved shoe, a portion of one of its sides being broken away. Fig. 2 is a transverse section through the shoe, taken practically on the line 2—2 of Fig. 1. Fig. 3 is a bottom plan view of the toe portion of the shoe. Fig. 4 is a section taken through the toe calk and its seat, practically on the line 4—4 of Fig. 3. Fig. 5 is a detail perspective view of one of the calks. Fig. 6 is a detail perspective view of one of the fastening blocks or wedges for the calks. Fig. 7 is a longitudinal section through the calk seat, taken essentially on the line 7—7 of Fig. 1; and Figs. 8 and 9, are transverse sections through the said calk seat, taken practically on the lines 8—8 and 9—9, respectively, of Fig. 1.

The shoe is constructed in two hinged members designated respectively as A and B, and one of the members is shorter than the other, the hinge of the two members occurring at one side of the toe. The hinged connection between the members is effected by providing one member with a tongue 10 of circular construction and of about one-half the thickness of the remaining portion of said member, the tongue being preferably made upon the larger member A. Adjacent to the circular portion of the tongue an angular recess 11, is made in the inner edge of the said section, as shown best in Fig. 3. The shorter member B, is provided in its under face with a socket 12, adapted to receive the circular portion of the tongue; and the shorter member B, is likewise provided with a latch head 13, adapted to enter the recess 11 in the longer member when both members are in position to form a perfect or complete shoe, as is shown in both Figs. 1 and 3. It will be understood that where the two members are connected they are combinedly of the same thickness as the body portion of any one of the members. The hinge connection is effected by passing a pintle 14 through the circular portion of the tongue 10, and likewise through the portion of the short section B of the shoe located above the tongue; and the pintle is properly headed at both ends, the end portions being flush, or practically so, with the top and bottom surfaces of the shoe.

Each member of the shoe is made angular in cross section, and comprises therefore a tread section 15 and a flange section 16. The flange section is carried up from the outer edge of the tread section, as shown in Figs. 2, 8 and 9, and is located at an acute angle thereto, the flange section being carried upward and inward at any angle necessary to insure the flange bearing against the outer face of a hoof.

The members A and B of the shoe are locked upon the hoof by means of a rod 17, or its equivalent, which is passed through sockets 18, made in the heel portion of each member. The rod 17, is provided with a head 19, at one end, said head being of polygonal shape, and its opposite end is threaded to receive a lock nut 20 and likewise a jam nut, if such is required. Recesses 21, are made in the heel portions of the members, receiving respectively the head and nuts of the bar 17, in order that the bar shall not be turned by objects striking its head, or the nuts loosened by reason of a like cause, or if in practice it is found desirable one socket may be square and the locking or connecting bar likewise square in cross section where it passes through said socket; or both of the sockets may be square, in which event the locking or connecting bar will be square throughout its length, except at one end where it will be made cylindrical and threaded to receive a lock nut. The upper or hoof contacting face 22, of the tread section of each member is roughened in any suitable or approved manner, as shown in Fig. 1, to prevent the possibility of the hoof slipping thereon, and to provide for a better purchase for the hoof.

In order that toe and heel calks may be used in connection with the shoe when desired, at the toe portion of the shoe and likewise at the heel of each member of the shoe, openings 23, are produced of greater length than width, and the toe openings are necessarily curved to a much greater extent than the heel openings. In fact, the openings for the calks correspond in longitudinal shape to the curvature of the part of the shoe in which they may be located. The openings for the reception of the calks are reduced in width at one end by forming integral with or attached to the sides of the opening lugs 24, which lugs are beveled downwardly and extend from top to bottom of the openings, the lower portions of the lugs being wider than the upper portions; and in this manner the space between the lugs may be said to be more or less of dove-tail contour; and the end wall of the wider portion of each calk-receiving opening is beveled preferably in a downwardly direction, as shown at 25 in Figs. 1 and 7, the dovetail cross sectional shape of the narrower portions of the openings being best shown in Fig. 9, while the rectangular shape of the wider portions of the openings is shown in Fig. 8.

The calks 26, may be either plain or sharp as occasion may demand and may be of any desired size. One of the calks is illustrated in detail in Fig. 5, and the said calk is provided upon its upper face with a rib or block 27, dove-tailed shape in cross section, corresponding in cross section to the cross sectional shape of the narrower portion of the opening 23 into which it is to be introduced. The block or rib 27 of the calk may be flush with one end or may be located slightly back of the end; but in either event quite a space 28, is left between one end of the rib or block and an end of the calk.

The calks are introduced in the following manner: The rib or block of a calk is entered into an opening 23 at the wider portion thereof, and is then carried to the narrower portion, the rib or block being slid upon the inclined lugs 24 until the outer end of the calk meets the outer wall of the opening. The calk is held in this position by means of a tie or wedge block 29, shown in detail in Fig. 6. This block is practically of rectangular shape, being provided at one end with a beveled surface 30; and after the calk has been placed in position in the opening the straight end of the wedge or tie block is made to rest upon the surface 28 of the calk, abutting the adjacent end of the rib upon the calk; and the block is made of such length that when such contact occurs, by pressing the block downward its beveled surface will engage with the beveled end 25 of the opening and both the tie or wedge block and the upper surface of the rib of the calk will be flush with the upper or hoof contacting face tread section of the shoe as shown in Fig. 4. It is thus evident that the calks may be readily placed in position in the shoe and as readily removed therefrom, or replaced by others of a different character; furthermore it is evident that in placing the shoe in position upon the hoof of a horse, all that is necessary is to remove the locking rod or bar 17 from engagement with one member of the shoe, when by spreading the members apart the hoof may be made to enter one section of the shoe, the other section being thereupon closed in against the hoof; the locking bar or bolt is then replaced in the manipulated member and the two members are then drawn together at the heel.

It will be utterly impossible for the shoe to slip from the hoof when once it is adjusted thereon, and owing to the dispatch and convenience with which the shoe can be placed upon the hoof or removed therefrom, an operator is enabled to remove the shoes at night, when the animal can not injure itself or others, and likewise can rest the feet. Furthermore, no nails are employed in the attachment of the improved shoe, and consequently the hoof is not damaged in shoeing. Again, the weight of the animal upon the tread section of the shoe serves to maintain the calks in position, and exerts such tension upon the members that the locking bolt or rod is not liable to turn.

It will be understood that the hinge of the shoe is preferably upon the outer side.

Having thus described my invention, I claim as new and desire to secure by Letters Patent—

1. A horse shoe, comprising two sections of unequal length and pivoted together, each section being provided with an inwardly and upwardly extending flange, the longer section being provided with a recess at its pivoted end and the shorter section with a latch head entering said recess, and a rod passing through apertures in the ends of the said sections, substantially as described.

2. A horse shoe, comprising two flanged sections of unequal length and pivoted together, the longer section being provided with a recess and the shorter section with a latch head entering said recess, detachable toe and heel calks, and a rod passing through sockets in the ends of the sections, substantially as herein shown and described.

3. The combination with a horse shoe provided with an opening extending through the same, from the upper to the tread surface one end of the opening being dovetailed in cross section, of a calk having a dove tailed rib fitting in the dovetail portion of the said opening, and a tie block fitting in and filling the portion of the opening not occupied by the rib of the calk, said tie block being inserted from the hoof contacting face of the shoe, thereby locking the calk in place substantially as and for the purposes described.

4. The combination with a horse shoe provided with an opening extending through the same from the upper to the tread surface, one end of the opening being dovetailed in cross section, and the end of the other portion of the opening being beveled from the hoof contacting surface of the shoe downwardly, of a calk provided with a dovetailed rib fitting the dovetailed portion of the opening, and a rectangular tie block having one end beveled and fitting in the portion of the opening not occupied by the rib of the calk and locking the same in place, substantially as herein shown and described.

ARTHUR E. OGDEN.

Witnesses:
ISAAC C. A. THORN,
JOHN B. OGDEN.